Sept. 28, 1943. R. W. HART 2,330,423
SEPARATOR
Filed Dec. 29, 1941
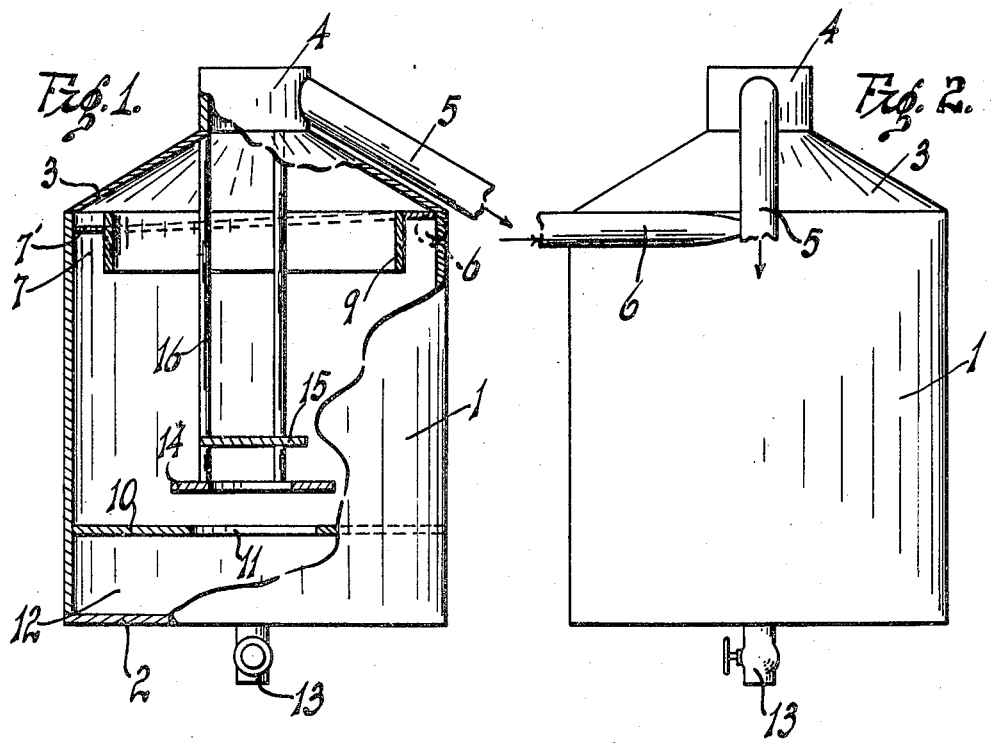
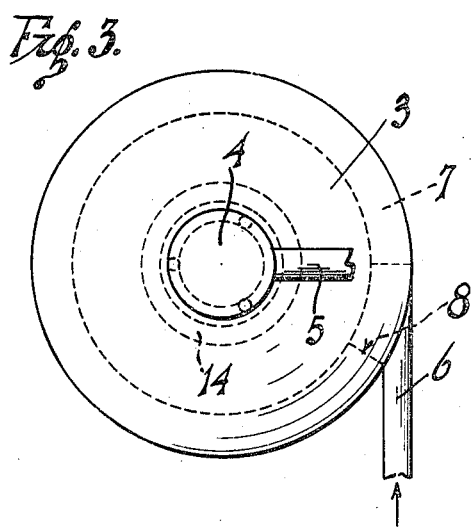
INVENTOR.
RAY W. HART.
BY
ATTORNEY.

Patented Sept. 28, 1943

2,330,423

UNITED STATES PATENT OFFICE 2,330,423

SEPARATOR

Ray W. Hart, Long Beach, Calif.

Application December 29, 1941, Serial No. 424,728

2 Claims. (Cl. 209—211)

This invention relates to a separator wherein materials of different specific gravity may be separated. Specifically, my invention is adapted to the separation of materials in water or other liquids, the extraneous materials being such as sand, shale, or the like.

An object of my invention is to provide a novel separator in which the material is forced into the separator tangentially, thus imparting to the liquid an arcuate velocity as well as a vertical motion.

Another object of my invention is to provide a novel separator of the character stated, in which baffles are provided against which the fluid impinges, these baffles causing the extraneous material to be thrown downwardly and thence separated from the fluid, which fluid passes upwardly to the outlet in the separator.

Another object is to provide a novel separator of the character stated, which is simple in construction, effective in operation, and also automatic in its operation.

Other objects, advantages and features of invention may appear from the accompanying drawing, the subjoined detailed description and the appended claims.

In the drawing:

Figure 1 is a side elevation of my separator with parts broken away to show interior construction.

Figure 2 is a side elevation of my separator.

Figure 3 is a top elevation of the same.

The principle of my separator is based upon the flow of fluid in an arcuate path. The fluid, as it flows in an arcuate path, has a secondary motion. This motion is helical, the center of the helix being the vertical axis of the housing of the separator. This helix which the fluid follows, extends downwardly from the inlet of the fluid.

My separator includes a substantially cylindrical housing 1 which is closed at the bottom by the wall 2, and closed at the top by the conical head 3. A cap pipe 4 is mounted on top of the cover 3, and this cap may be open or closed at the top and is open at the bottom. An outlet pipe 5 extends from the cap 4. The fluid, after separation, flows out of this pipe, as will be further described. An intake pipe 6 extends tangentially into the housing 1 and adjacent the upper end of this housing. The intake 6, extends into an intake passage 7, in which a helical wall 7 is placed, the helical wall starting at the point of entrance of the intake pipe 6 into the housing 1, and terminating substantially at the point indicated as 8, somewhat below the intake pipe 6. The passage 7 extends between the wall of the housing 1 and a short inwardly spaced annular wall 9. The purpose of this construction is to confine the incoming fluid and to cause it to follow an accurate helical path within the separator.

A transverse diaphragm 10 is mounted within the housing 1, and is spaced a suitable distance above the bottom wall 2 of the housing. A central hole 11 in the diaphragm permits extraneous separated material to drop into the chamber 12 from which this extraneous material is moved through the valve controlled outlet pipe 13. A baffle ring 14 is mounted above the diaphragm 10, and is preferably centrally arranged within the housing 1. A baffle plate 15 is mounted above the ring 14, and is positioned over the central opening in this ring. A number of rods 16 extend to the baffles 14 and 15 and support these baffles.

From the foregoing description it will be evident that in my separator a fluid is forced tangentially into a cylindrical housing. Due to the initial velocity of the fluid as it enters the separator, fluid will flow around within the housing. When a fluid is flowing in a circular, or arcuate, path centrifugal forces are set up which cause particles of matter to settle faster than the main body of the fluid. These heavier particles of matter move toward the outer wall of the separator, and the amount of the movement of these particles may be controlled. The method of controlling the movement of the separated particles is (1st) by the velocity of the entering fluid, and (2nd) by the distance between the point of entrance of the fluid into the separator and the bottom of the separator. Since the fluid flows downwardly along the outer wall of the separator, and inwardly along the bottom wall, or diaphragm, of the separator, centrifugal force acts during the time that the fluid is moving downwardly.

The helical wall 7' in the passage 7, provides a means of definitely controlling the velocity of the secondary currents moving downwardly along the outer wall of the separator. The heavier particles of material which will be forced against the outer wall of the separator, due to centrifugal force, as the fluid flows downwardly, then as the fluid turns inwardly at the bottom, this same separated material will be next to the bottom of the fluid. The fluid must now rise because of the secondary helical current, and also because fluid is continuously entering the separator. That portion of the fluid which is at the center of the separator and is moving inwardly and upwardly towards the outlet 5, engages the baffles 14 and 15, thus reducing the velocity of the fluid as it moves upwardly. The baffles are so formed to permit a continuous relatively slow movement of the fluid beneath the baffle and the ultimate discharge of the fluid after the separated particles have settled to the bottom by sedimentation.

The baffles may either be fixed or they may be adjustable if desired. The separated material falls through the opening 11 into the chamber 12, and the baffles 14 and 15 are both aided in knocking the particles of material downwardly, and thence through the opening 11. The separated fluid now passes upwardly into the cap 4, and thence out through the pipe 5. In particular cases I find that it is possible to control the size of the solid particles which are removed from the fluid (sand for example). I attribute this action largely to the use of baffles such as the baffles 14 and 15.

Having described my invention, I claim:

1. A separator comprising a housing, a cap extending upwardly from the top of said housing centrally thereof and provided with a side outlet, an inlet pipe extending at a tangent to a side of said housing and registering with an inlet opening formed through the side of the housing at the top thereof, an annular wall in the upper end of said housing spaced from sides thereof and constituting an inner side wall of an inlet passage with which the inlet pipe communicates, a top wall for the inlet passage extending spirally about the annular inner wall and constituting a deflector for directing incoming liquid in a spiral path downwardly through the inlet passage and the housing toward the bottom of the housing, a diaphragm mounted horizontally in said housing upwardly from the bottom thereof and formed with an opening at its center, rods extending vertically in said housing with their upper ends secured to the top thereof in spaced relation to each other circumferentially of the cap, a horizontal baffle ring at lower ends of said rods spaced upwardly from said diaphragm, said ring being of greater diameter than the opening in the diaphragm and formed with a center opening of less diameter than the said opening of the diaphragm, and a solid baffle plate secured to said rods and supported horizontally thereby over the opening of the baffle ring in vertical spaced relation thereto.

2. A separator comprising a housing, a cap extending upwardly from the center of the upper end of said housing and provided with an outlet, an inlet pipe leading to said housing at a tangent thereto and communicating with the housing through a side opening at the top thereof, means in said housing, means in said housing in cooperating relation to the side opening for directing incoming liquid circumferentially of the receptacle in a downwardly direction in a spiral path, a diaphragm mounted horizontally in said housing in upwardly spaced relation to the bottom of the housing and formed with a large central opening, rods extending downwardly from said cap and spaced from each other circumferentially thereof, a horizontal baffle ring of greater diameter than the opening in said diaphragm mounted horizontally at lower ends of said rods above the diaphragm and formed with a center opening of less diameter than the opening of the diaphragm, and a baffle disc carried by said rods and spaced upwardly from said ring above the opening of the ring.

RAY W. HART.